US012652250B2

(12) United States Patent (10) Patent No.: US 12,652,250 B2
Jain et al. (45) Date of Patent: Jun. 9, 2026

(54) RATE ADJUSTMENT BASED ON NUMBER OF CONGESTED PATH

(71) Applicant: Advanced Micro Devices, Inc., Santa Clara, CA (US)

(72) Inventors: Vipin Jain, Santa Clara, CA (US); Raghava Sivaramu, Santa Clara, CA (US); Rong Pan, Santa Clara, CA (US); Yanfang Le, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/731,002

(22) Filed: May 31, 2024

(65) Prior Publication Data

US 2025/0373551 A1 Dec. 4, 2025

(51) Int. Cl.
*H04L 47/11* (2022.01)
*H04L 47/125* (2022.01)
(52) U.S. Cl.
CPC ............ *H04L 47/11* (2013.01); *H04L 47/125* (2013.01)
(58) Field of Classification Search
CPC ..... H04L 47/12; H04L 47/122; H04L 47/125; H04L 47/263; H04L 47/25; H04L 47/41; H04L 47/267; H04L 47/11; H04L 45/24
See application file for complete search history.

(56) References Cited

U.S. PATENT DOCUMENTS

2008/0267216 A1* 10/2008 Vergnaud ................ H04L 65/80
370/474
2011/0235651 A1* 9/2011 Martinez ............... H04L 47/125
370/419

OTHER PUBLICATIONS

N. Wang, C. Duan, J. Li and H. Shi, "MPCR: Multi-path Credit Reservation Protocol," 2020 IEEE 3rd International Conference of Safe Production and Informatization (IICSPI), Chongqing City, China, 2020, pp. 482-487 (Year: 2020).*
F. Wu, W. Yang, M. Sun, J. Ren and F. Lyu, "Multi-Path Selection and Congestion Control for NDN: An Online Learning Approach," in IEEE Transactions on Network and Service Management, vol. 18, No. 2, pp. 1977-1989, Jun. 2021 (Year: 2021).*

* cited by examiner

*Primary Examiner* — Messeret F Gebre
(74) *Attorney, Agent, or Firm* — Patterson + Sheridan, LLP

(57) ABSTRACT
Embodiments herein describe tracking the number of congested paths in a multipath connection between endpoints to determine when to throttle the data being transmitted by a sender. In one embodiment, the embodiments herein permit a sender to determine whether congestion is caused by the receiver (or the network as a whole) being congested or only a few paths in the network being congested. The receiver may provide congestion signals that indicate congested paths as feedback to the sender. The sender can track the number of congested paths. For example, the sender can determine a ratio between the number of congested paths and the total paths in the multipath connection. Once this ratio reaches a threshold, the sender may begin data throttling. However, until then, the sender may redirect data that would have been sent on the congested paths to paths that are not yet congested.

17 Claims, 6 Drawing Sheets

RATE ADJUSTMENT BASED ON NUMBER OF CONGESTED PATH

TECHNICAL FIELD

Examples of the present disclosure generally relate to using a number of congested paths in a multipath connection to determine when to throttle the sender.

BACKGROUND

Multipathing is one way to improve the fabric bisectional bandwidth utilization. By sending traffic for a given flow to more than one paths in the network, the number of collision points is reduced resulting in higher fabric bandwidth utilization. Path selection is typically done using multiple sessions (e.g. TCP session), or using UDP entropy (src-port). However, there can be congestion on the various paths used to communicate between two endpoints in a network (e.g., two smart network interface cards/controllers (SmartNICs)).

Rate limiting is a historical mechanism to manage congestion. Rate limiting is used to pace the outbound rate at the sender to avoid congestion or enabling priority flow control (PFC). For example, rate limiting when used in conjunction with congestion signals (e.g. Explicit Congestion Notification (ECN) marking on the packets) can be an effective way to defer PFC in the network. However, rate limiting has not been successfully applied to multipathing.

SUMMARY

One embodiment described herein is a sending networking device that includes a congestion detector comprising circuitry configured to receive a report of a congested path from a receiving networking device, wherein the sending networking device is configured to use a multipath connection to transmit data over a network to the receiving networking device and update a congested path metric based on the report of the congested path, wherein the congested path metric tracks a number of congested paths in the multipath connection. The device also includes a congestion mitigator comprising circuitry configured to throttle the data being transmitted from the sending networking device to the receiving networking device after the congested path metric satisfies a threshold.

One embodiment described herein is a sending networking device that includes one or more processors and memory storing an one or more software applications which, when executed by any combination of the one or more processors performs an operation. The operation includes receiving, at a sending networking device, a report of a congested path from a receiving networking device where the sending networking devices uses a multipath connection to transmit data over a network to the receiving networking device, updating a congested path metric based on the report of the congested path where the congested path metric tracks a number of congested paths in the multipath connection, and upon determining that the congested path metric exceeds a threshold, throttle the data being transmitted from the sending networking device to the receiving networking device.

One embodiment described herein is a method that includes receiving, at a sending networking device, a report of a congested path from a receiving networking device where the sending networking devices uses a multipath connection to transmit data over a network to the receiving networking device, updating a congested path metric based on the report of the congested path where the congested path metric tracks a number of congested paths in the multipath connection, and upon determining that the congested path metric exceeds a threshold, throttle the data being transmitted from the sending networking device to the receiving networking device.

One embodiment described herein is system that includes a receiving networking device and a sending networking device configured to use a multipath connection to transmit data over a network to the receiving networking device. The receiving networking device is configured to transmit a report of a congested path to the sending networking device. The sending networking device is configured to update a congested path metric based on the report of the congested path where the congested path metric tracks a number of congested paths in the multipath connection and throttle the data being transmitted from the sending networking device to the receiving networking device after the congested path metric satisfies a threshold.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
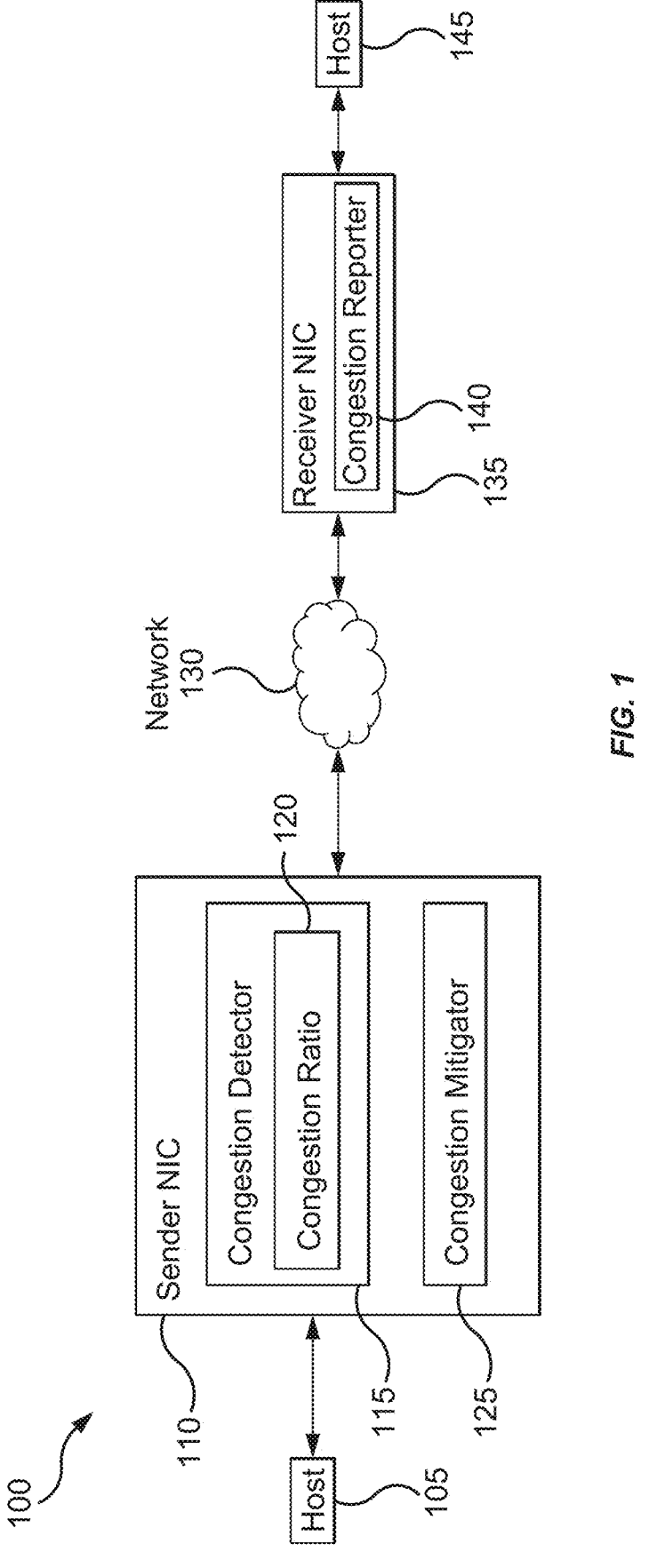
FIG. 1 illustrates a block diagram of a communication system, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the embodiments herein or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe tracking the number of congested paths in a multipath connection between endpoints to determine when to throttle the data being transmitted by a sender (e.g., perform rate limiting or window management). In one embodiment, a sender determines whether congestion is caused by the receiver (or the network as a whole) being congested or by only a few paths in the network being congested. When the receiver or a large portion of the network is congested, then data throttling is performed. However, if only a few of the paths used in the multipath connection are congested, then data throttling may be avoided—e.g., the data that would have been sent on a congested path can be re-routed to a different non-congested path. In one embodiment, to distinguish between these different scenarios, the receiver may provide congestion signals that indicate congested paths as feedback to the sender. The sender can track the number of congested paths. For example, the sender can determine a ratio between the number of congested paths and the total paths in the multipath connection. Once this ratio reaches a threshold, the sender may begin data throttling. However, until then, the sender may redirect data that would have been sent on the congested paths to paths that the receiver has not yet said are congested.

FIG. 1 illustrates a block diagram of a communication system 100, according to an example. The system 100 includes a sender NIC 110 (e.g., a sending networking device) attached to a host 105 and a receiver NIC 135 (e.g., a receiving networking device) connected to a host 145. In one embodiment, the sender NIC 110 can be one endpoint and the receiver NIC 135 can be another endpoint which are connected by a network 130. The network 130 can include a plurality of switches or other types of networking devices.

In one embodiment, the sender NIC 110 and the receiver NIC 135 are SmartNICs. However, the embodiments herein at not limited to using NICs, can be implemented on any endpoints of a network. More embodiments of the hosts 105, 145 and the NICs 110, 135 are provided in FIG. 6 below.

In FIG. 1, the sender NIC 110 includes a congestion detector 115 and a congestion mitigator 125. These components can be hardware (e.g., hardened or programmable logic), firmware, software applications, or combinations thereof. In any case, the functions of the congestion detector 115 and the congestion mitigator 125 can be executed using circuitry on the sender NIC 110.

The congestion detector 115 can measure (or detect) congestion in the network 130 or at the receiver NIC 135. For example, the receiver NIC 135 can be considered part of the network. That is, in one embodiment, the interfaces between the NIC 110 and the host 105, and between the NIC 135 and the host 145 can be the end of the network 130.

In one embodiment, the sender NIC 110 uses multiple paths (i.e., a multipath connection) to transmit data to the receiver NIC 135. That is, the sender NIC 110 assigns packets to different paths (which can use different switches in the network 130) to transmit packets to the receiver NIC 135. In this embodiment, the congestion detector 115 tracks a congestion ratio 120 which measures the number of congested paths in the network 130 versus the total number of paths used to transmit data from the sender NIC 110 to the receiver NIC 135.

If the congestion ratio 120 reaches a threshold, the sender NIC 110 can use the congestion mitigator 125 to reduce congestion at the network 130 or the receiver NIC 135. For example, the congestion mitigator 125 may perform rate limiting or window management to reduce the amount of traffic the sender NIC 110 transmits to the receiver NIC 135. The embodiments herein are not limited to any particular congestion algorithm for the congestion mitigator 125, and can be used with any suitable algorithm that limits data traffic in a multipath connection.

The receiver NIC 135 includes a congestion reporter 140, which can be hardware (e.g., hardened or programmable logic), firmware, a software application, or combinations thereof. The congestion reporter 140 provides notifications when there is congestion on a particular path in the network 130, which can include congestion at the receiver NIC 135 itself. There are many different ways of determining congestion, but one often used technique is Explicit Congestion Notification (ECN). ECN is an extension to the Internet Protocol and to the Transmission Control Protocol that allows end-to-end notification of network congestion without dropping packets. When a switch in the network 130 detects congestion, it can mark a packet that is sent to the receiver NIC 135. The receiver NIC 135 can then identify which path of the multipath connection the packet was sent on and send a report to the sender NIC 110. This is shown in more detail in FIGS. 3 and 4. In this manner, the congestion detector 115 can be alerted to congestion and update the congestion ratio 120.

Additionally, the receiver NIC 135 can detect internal congestion, such as when packets are being buffered at the interface between the receiver NIC 135 and the host 145 (e.g., a PCIe interface or a host facing interface). When the buffer reaches a threshold and a new packet arrives from the network 130, the receiver NIC 135 can use ECN (or any suitable congestion technique) to inform the sender NIC 110. Thus, even though there may not be congestion in the network devices in the network 130, the congestion reporter 140 can still indicate congestion associated with a particular path when the congestion is at the receiver NIC 135. This is discussed in more detail in FIG. 6.

Tracking the congestion ratio 120 using the information provided by the congestion reporter 140 on the receiver NIC 135 helps the sender NIC 110 to identify congestion on a particular path, versus congestion on the network 130 as a whole or at the receiver NIC 135. That is, once the congestion ratio 120 exceeds a threshold, the sender NIC 110 may determine that the congestion is due to congestion on the network as a whole or at the receiver, and in response, activate the congestion mitigator 125 to throttle the data being sent to the receiver NIC 135. In contrast, before the threshold is reached, the sender NIC 110 may send more traffic on non-congested paths of the multipath connection while avoiding the congested paths, thereby maintaining the same data rate or throughput.

Figure 2:
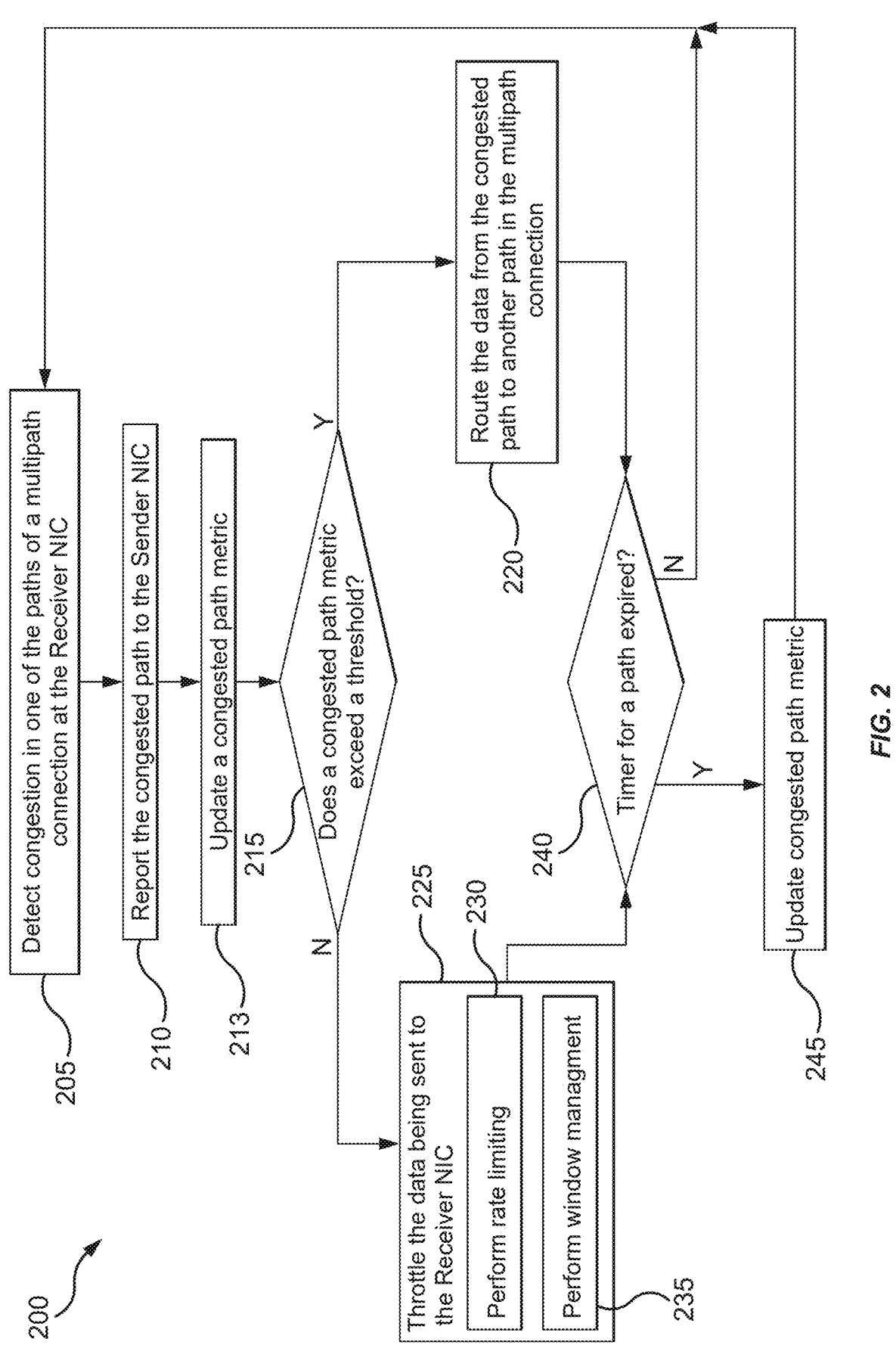
FIG. 2 is a flowchart for throttling a sender using a number of congested paths, according to an example.

FIG. 2 is a flowchart of a method 200 for throttling a sender using a number of congested paths, according to an example. At block 205, the congestion reporter at the receiver NIC detects congestion in one of the paths of a multipath connection. This congestion could be reported by a switch in the network (as discussed in FIGS. 3 and 4) or congestion within the receiver NIC itself (as discussed in FIG. 5). In one embodiment, the congestion is detected using ECN, or some other suitable congestion detection algorithm.

At block 210, the congestion reporter reports the congested path to the sender NIC. This report can include congestion signals that indicate a particular path in the multipath signal where congestion was detected. That is, the receiver NIC can tell the sender NIC on a per-path basis where congestion was detected, regardless whether that congestion was detected by a switch in the network or within the receiver NIC.

At block 213, the congestion detector on the sender NIC updates a congested path metric using the report. In one embodiment, the congested path metric is a congestion ratio of the number of congested paths (as reported by the receiver NIC) versus the total number of paths in the multipath connection. Because the sender NIC selects the number of paths used to transmit data to the receiver NIC, it can track the total number of paths in the multipath connection. The number of congested paths is provided by the sender NIC to the receiver NIC at block 210.

However, the congested path metric is not limited to a ratio. In another embodiment, the congested path metric can be the total number of congested paths in the multipath connection, which is compared to a threshold. In this example, the system administrator can configure the congestion detector to detect congestion based solely on the number of congested paths, regardless of the total number of paths in the multipath signal.

At block 215, the congestion detector on the sender NIC determines whether the congested path metric exceeds a threshold. For example, the threshold may indicate a maximum ratio, or a maximum number of acceptable congested paths. In any case, the threshold can be set by a system administrator to distinguish between when there is congestion on the network as a whole or congestion at the receiver, instead of congestion at only a few switches in the network.

If the congested path metric does not exceed the threshold, the method 200 proceeds to block 220 where the sender NIC routes the data from the congested path to another path in the multipath connection. In this case, the sender NIC may not throttle the amount of total data being sent to the receiver NIC, but rather reduce the amount of data sent on the congested path and increase the amount of data sent on one or more uncongested paths (i.e., paths in the multipath connection where the sender NIC has not reported congestion). Thus, in that scenario, the method 200 does not throttle traffic until the congestion path metric satisfies the threshold.

Assuming the congested path metric does satisfy the threshold at block 215, the method 200 instead proceeds to block 225 where the congestion mitigator throttles the data being sent to the receiver NIC. Here, the overall data being sent to the receiver NIC is reduced in response to the congestion. As discussed above, this may be because once the congested path metric exceeds a threshold, this indicates the network as a whole is congested, or the receiver NIC is congested, rather than a few paths in the multipath connection being congested.

The block 225 includes two sub-blocks 230 and 235 which describe different techniques for throttling the overall data being sent to the receiver NIC. At sub-block 230, the congestion mitigator can perform rate limiting to reduce the rate at which data is transmitted from the sender NIC onto the network. At sub-block 235, the congestion mitigator can instead perform window management to throttle the data. In many congestion-window based algorithms, the transmit window is a way to control the sender from sending no-more than determined by the congestion management algorithm. Controlling the transmit window size is an alternative to the rate-limiting but in principle, both rate limiting and window management throttle or curtail the outbound traffic from the sender NIC.

Moreover, performing block 225 to throttle the outbound data can have the advantage of avoiding PFC. Performing PFC can negatively impact other sender NICs using the same network to transmit data. That is, performing PFC in response to congestion can reduce the amount of data that is sent between other sender/receiver NICs using the same network even if these NICs are not experiencing congestion.

At block 240, the sender NIC determines whether a timer for a congested path has expired. For example, when receiving a report of a congested path and updating the congested path metric, the sender NIC may also start a timer. Once that timer expires, the method 200 proceeds to block 245 where the sender NIC updates the congested path metric to indicate that the path may no longer be a congested path. This can cause the sender NIC to again attempt to send data on the path. That way, the sender NIC does not continue to avoid that path even though the reason it was previously congested has been resolved (e.g., another sender/receiver combination has stopped sending traffic using the switch that also supported the congested path, or the backlog in the PCIe interface from the receiver NIC to the host has cleared).

The method 200 can then return to block 205 where the receiver NIC can again monitor received traffic. If the path is still congested, the receiver NIC can send a report at block 210 and the sender NIC can again mark the path as congested and update the congested path metric. In this manner, the congested path metric can be updated as paths in the multipath connection are added and removed from a congested path list.

Figure 3:
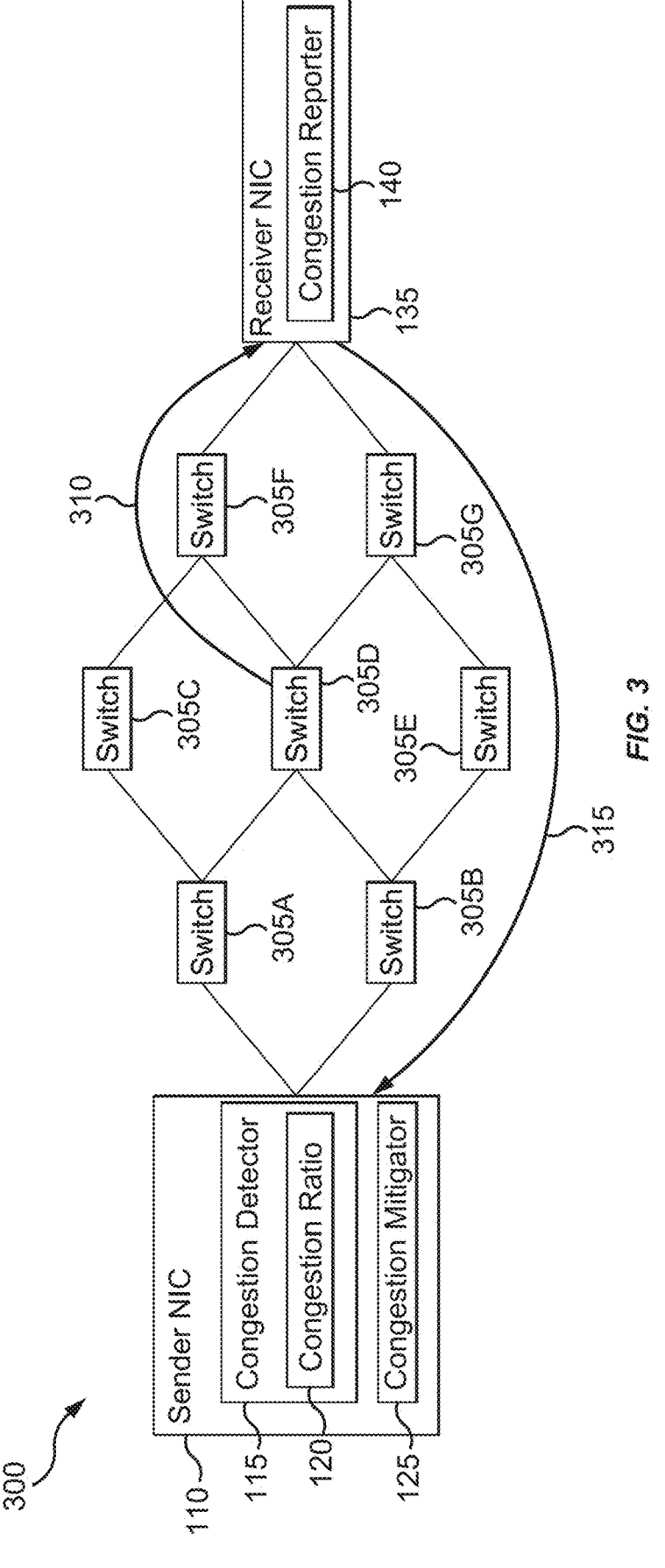
FIG. 3 illustrates network congestion at a switch, according to an example.

FIG. 3 illustrates network congestion at a switch, according to an example. A system 300 in FIG. 3 illustrates a network of switches 305 that enable a multipath connection between the sender NIC 110 and the receiver NIC 135. Although not labeled, the sender NIC 110 may use multiple paths that flow through all of the switches 305A-G, or only a sub-portion of the switches 305A-G. In this example, the switch 305D is currently experiencing congestion. This may because additional sender/receiver pairs are also using switch 305D to support their paths, which may overwhelm the switch 305D.

In one embodiment, the switch 305D can monitor a transmit buffer. Once the buffer exceeds a threshold, the switch 305D can begin marking packets to indicate it is experiencing congestion. As mentioned above, one suitable congestion tracking technique is ECN, but the embodiments herein are not limited to such.

The arrow 310 illustrate a packet that has been marked by the switch 305D to indicate it is experiencing congestion. This packet is forwarded to the switch 305F and then to the receiver NIC 135.

As discussed above, the congestion reporter 140 on the receiver NIC 135 can receive the marked packet and then transmit a report (e.g., congestion signals) to the sender NIC 110 as shown by the arrow 315. In one embodiment, the receiver NIC 135 may transmit the report through switches that do not include the switch reporting the congestion (e.g., a path which does not include the switch 305D). This report can indicate that path of the multipath connection that detected the congestion.

The congestion detector 115 can receive this report and update the congestion ratio 120 (which is one example of a congestion path metric). In this example, it is assumed that the switch 305D is the only switch 305 to report congestion. Thus, the congestion ratio 120 will not exceed a threshold, since the threshold may be set to a larger threshold so the congestion detector 115 can distinguish between only a few paths experiencing congestion versus widespread congestion on the network or at the receiver. As such, the scenario shown in FIG. 3 is likely not to trigger the congestion mitigator 125. Instead, the sender NIC 110 may transmit additional data to paths through the switches 305 that avoid the path that included the switch 305D. As such, at this point, the sender NIC 110 may not throttle or curtail the amount of data it transmit to the receiver NIC 135.

Figure 4:
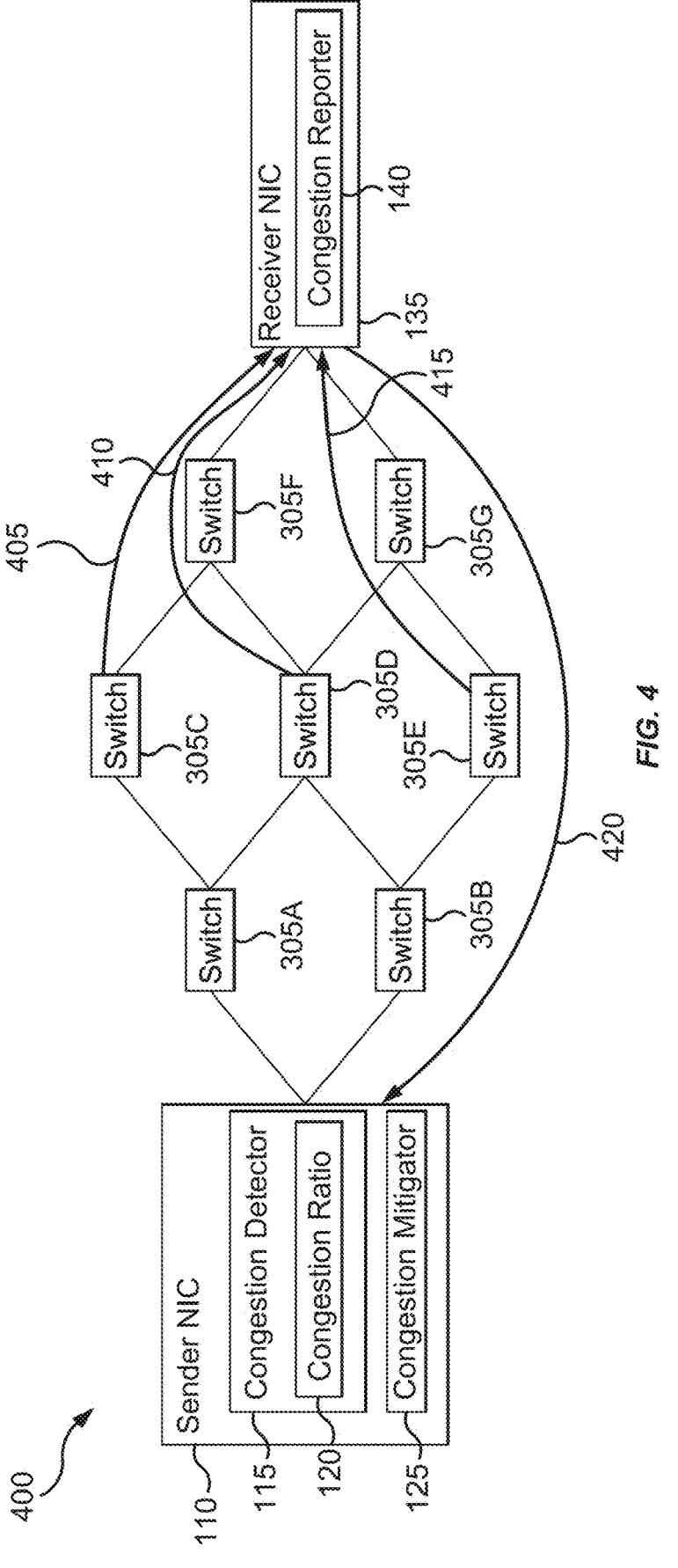
FIG. 4 illustrates network congestion at multiple switches, according to an example.

FIG. 4 illustrates network congestion at multiple switches, according to an example. The system 400 illustrates the same sender NIC 110, receiver NIC 135, and switches 305 as shown in FIG. 3. However, instead of only one switch transmitting a report of congestion to the receiver NIC 135, three switches mark packets indicating a corresponding path is experiencing congestion: the switches 305C-E. The arrows 405, 410, and 415 in FIG. 4 illustrate these switches 305 transmitting marked packets to the receiver NIC 135.

In response, the receiver NIC 135 informs the sender NIC 110 of the congestion reported by the switches 305C-E. While FIG. 4 illustrates one arrow 420, the receiver NIC 135 may send three separate reports to the sender NIC 110 each time it receives the marked packets from the switches 305C-E.

The congestion detector 115 can receive this report (or reports) and update the congestion ratio 120. Because there are three congested paths in the scenario illustrated in FIG. 4, this may be sufficient to exceed the threshold and indicate there is widespread congestion on the network. As such, the scenario shown in FIG. 4 can trigger the congestion mitigator 125 which begins to throttle or curtail the amount of data the sender NIC 110 transmits to the receiver NIC 135.

Figure 5:
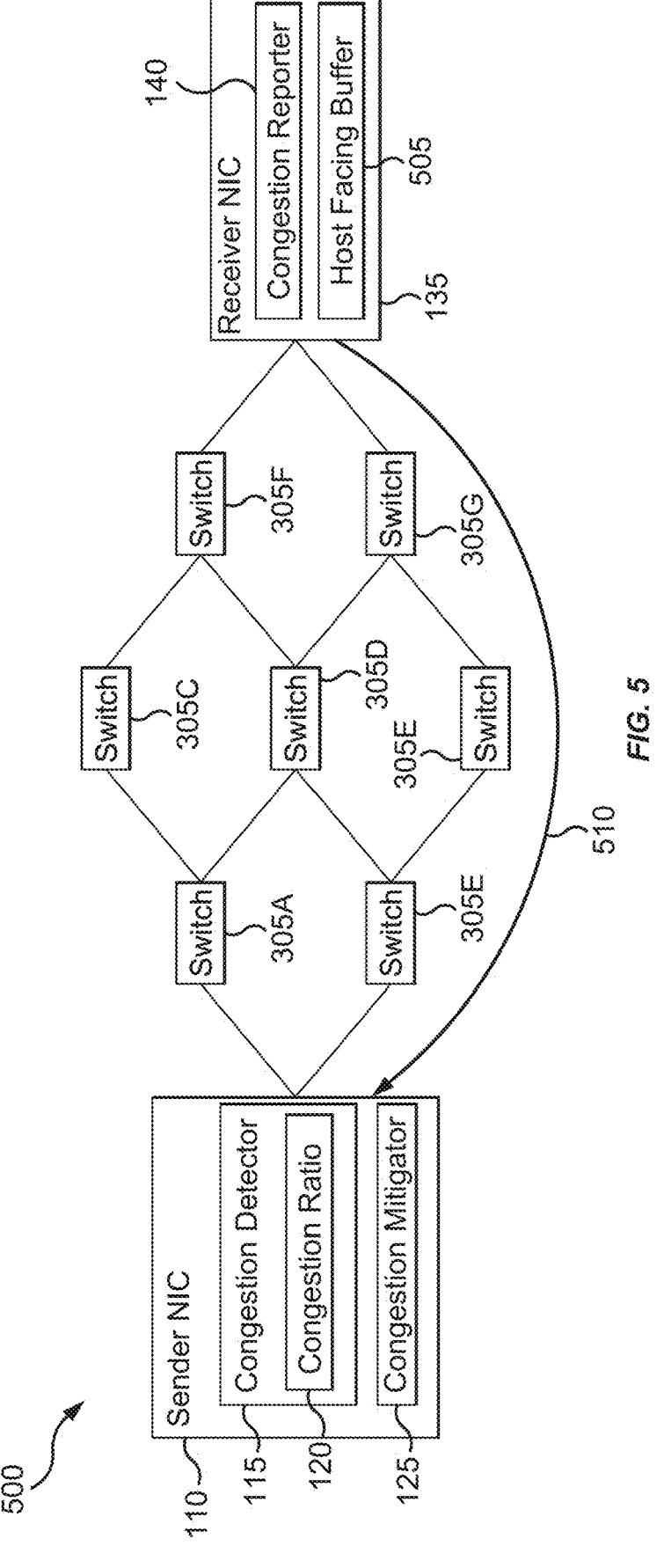
FIG. 5 illustrates network congestion at a receiver, according to an example.

FIG. 5 illustrates network congestion at a receiver, according to an example. The system 500 illustrates the same sender NIC 110, receiver NIC 135, and switches 305 as shown in FIG. 3. In this example, the receiver NIC 135 includes a host facing buffer 505 (e.g., one example of a host facing interface). This buffer 505 can be used by the receiver NIC 135 to store received packets from the switches 305 (and the sender NIC 110) before they are transmitted to the host. For example, the host facing buffer 505 may be an interface to a PCIe connection used to transmit the packet data to the host.

The congestion reporter 140 can monitor the usage of the host facing buffer 505. As the receiver NIC 135 receives packets and stores them in the host facing buffer 505, the congestion reporter 140 can determine whether doing so would cause the host facing buffer 505 to satisfy (e.g., exceed) a buffer utilization threshold. If so, the congestion reporter 140 can determine on which path the packet was received and then transmit a report to the sender NIC 110 as shown by the arrow 510, where this report includes the identity of the path.

As more packets are received and stored in the host facing buffer 505, if the utilization of the host facing buffer 505 continues to satisfy the utilization threshold, the congestion reporter 140 can send more reports to the sender NIC 110 indicating the paths on which those packets were transmitted. Thus, even though the switches 305 may not be the source of the congestion, the receiver NIC 135 can nonetheless use the paths through the switches 305 to track congestion and inform the sender NIC 110. Thus, in this example, the host facing buffer 505 is consider as part of the network and its congestion can be reported to the sender NIC 110 on a per-path basis.

As above, the congestion detector 115 can receive this report (or reports) and update the congestion ratio 120. If the host facing buffer 505 continues to exceed the utilization buffer, eventually more paths will be reported as being congested. In this case, because the congestion is at the receiver NIC 135, the sender NIC 110 may try to avoid using already report congested path, but if the buffer 505 utilization remains above the threshold, these paths will also be reported as congested. Put differently, assigning more data to the non-congested paths may not help to alleviate the congestion in the host facing buffer 505 (since the problem may be with the host). As such, the scenario shown in FIG. 5 can trigger the congestion mitigator 125 which begins to throttle or curtail the amount of data the sender NIC 110 transmits to the receiver NIC 135.

Figure 6:
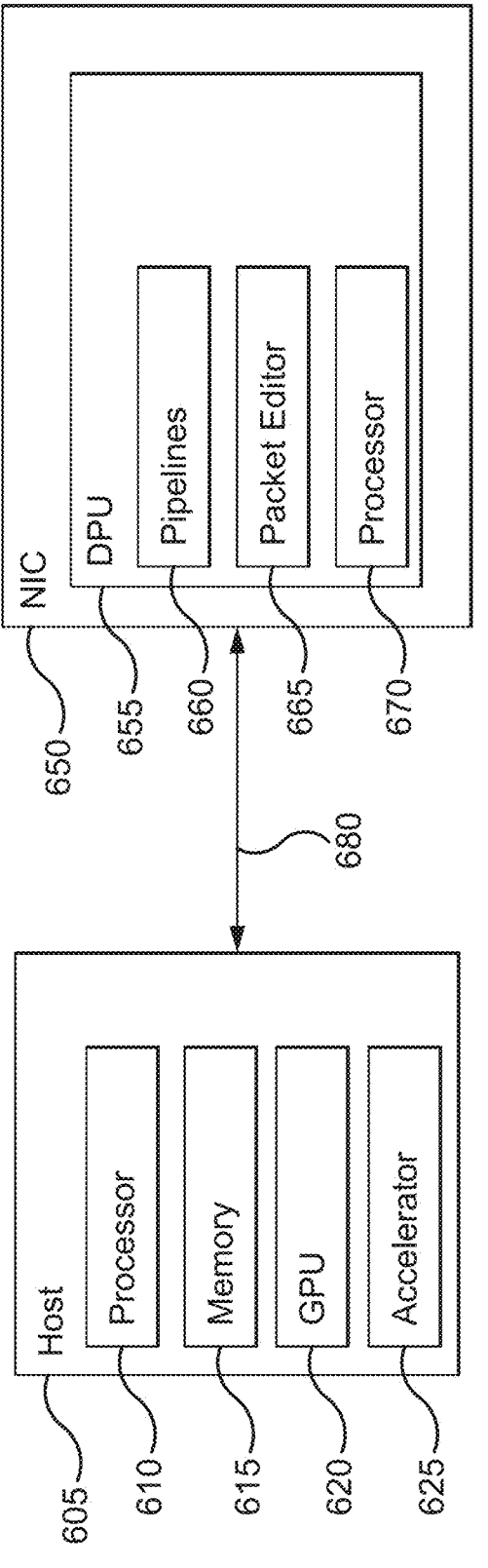
FIG. 6 illustrates a host and a NIC, according to an example.

FIG. 6 illustrates a host 605 and a NIC 650 in a system 600, according to an example. The host 605 and the NIC 650 are communicatively coupled using a PCI connection 680. Moreover, the NIC 650 may be disposed in a form factor of the host, although this is not a requirement. Moreover, the embodiments herein are not limited to a NIC 650 and can be performed on other suitable networking devices.

The host 605 can be any computing system or device. For example, the host 605 can be a single computing device such as a server, or can be a computing system such as computing resources in a cloud or a cluster. In this example, the host 605 includes a processor 610 which represents any number of processors which each can include any number of processor cores. For example, the processor 610 can be a CPU.

The memory 615 can include volatile memory elements, non-volatile memory elements, and combinations thereof.

The host 605 can also include a graphics processing unit (GPU) 620 and/or an accelerator 625. The accelerator 625 can be a field programmable gate array, a system on a chip (SoC), an application specific integrated circuit (ASIC) and the like. In one embodiment, the NIC 650 can be used as part of an accelerator function that relies on GPUs or accelerators in multiple hosts. For example, the embodiments herein may be used as part of a high performance compute (HPC) task such as a machine learning (ML) or artificial intelligence (AI) application where large amounts of data are transmitted between GPUs/accelerators on multiple hosts using the NICs. Moreover, the embodiments herein can be used in applications that desire a lossless network (as is the case with many HPC tasks) or in lossy networks.

The NIC 650 includes a data processing unit (DPU) 655. The DPU 655 may process packets before they are forwarded to the host 605. The DPU 655 includes pipelines 660, a packet editor 665, and a processor 670. DPUs 655 may have two types of pipelines 660: networking pipelines which perform networking tasks such as combining packets that were subdivided to be compatible with a maximum transmission unit (MTU) or for dealing with one or more host operating systems, drivers, and/or message descriptor formats in host memory, and direct memory access (DMA) pipelines which perform memory reads and writes. A received packet is first processed by a networking pipeline before being processed by a DMA pipeline.

The packet editor 665 includes circuitry for editing the received packet. For example, the packet editor 665 can perform commands in order to prepare the packet to be processed by one of the pipelines 660.

The processor 670 can be a CPU or a specialized processor (e.g., a microprocessor) for performing particular networking tasks. Moreover, the processor 670 can be hardened logic, or can be implemented using programmable logic in the DPU 655. For example, the processor 670 in the DPU 655 may perform the tasks discussed above by the congestion detector 115, congestion reporter 140, and/or congestion mitigator 125.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A sending networking device, comprising:
a congestion detector comprising circuitry configured to:
receive a report of a congested path from a receiving networking device, wherein the sending networking device is configured to use a multipath connection to transmit data over a network to the receiving networking device, and update a congested path metric based on the report of the congested path, wherein the congested path metric tracks a number of congested paths in the multipath connection, wherein the congested path metric is a ratio of a number of congested paths of the multipath connection versus a total number of paths in the multipath connection; and a congestion mitigator comprising circuitry configured to throttle the data being transmitted from the sending networking device to the receiving networking device after the congested path metric satisfies a threshold.

2. The sending networking device of claim 1, wherein the congestion detector is configured to, after updating the congested path metric:

after determining the congested path metric does not satisfy the threshold, reduce data sent on the congested path and increase data sent on other non-congested paths of the multipath connection.

3. The sending networking device of claim 2, wherein the congestion detector increases the data sent on the other non-congested paths of the multipath connection so that the sending networking device transmits data to the receiving networking device at least at a same rate that the sending networking device did before receiving the report of the congested path.

4. The sending networking device of claim 1, wherein throttling the data comprises at least one of performing rate limiting on the multipath connection or performing window management on the multipath connection.

5. The sending networking device of claim 1, wherein the report is based on at least one of a switch in the network reporting congestion to the receiving networking device or congestion at a host facing interface in the receiving networking device.

6. The sending networking device of claim 1, wherein the sending networking device is, or is part of, a network interface card or controller (NIC), wherein the receiving networking device is, or is part of, a NIC.

7. A sending networking device, comprising:

one or more processors; and memory storing one or more software applications which, when executed by any combination of the one or more processors performs an operation, the operation comprising:

receiving, at a sending networking device, a report of a congested path from a receiving networking device, wherein the sending networking device uses a multipath connection to transmit data over a network to the receiving networking device;

updating a congested path metric based on the report of the congested path, wherein the congested path metric tracks a number of congested paths in the multipath connection, wherein the congested path metric is a ratio of a number of congested paths of the multipath connection versus a total number of paths in the multipath connection; and upon determining that the congested path metric exceeds a threshold, throttling the data being transmitted from the sending networking device to the receiving networking device.

8. The sending networking device of claim 7, wherein the operation further comprises, after updating the congested path metric:

after determining the congested path metric does not satisfy the threshold, reducing data sent on the congested path and increasing data sent on other non-congested paths of the multipath connection.

9. The sending networking device of claim 8, wherein the operation increases the data sent on the other non-congested paths of the multipath connection so that the sending networking device transmits data to the receiving networking device at least at a same rate that the sending networking device did before receiving the report of the congested path.

10. The sending networking device of claim 7, wherein throttling the data comprises at least one of performing rate limiting on the multipath connection or performing window management on the multipath connection.

11. The sending networking device of claim 7, wherein the report is based on at least one of a switch in the network reporting congestion to the receiving networking device or congestion at a host facing interface in the receiving networking device.

12. The sending networking device of claim 7, wherein the sending networking device is, or is part of, a NIC, wherein the receiving networking device is, or is part of, a NIC.

13. A method comprising:

receiving, at a sending networking device, a report of a congested path from a receiving networking device, wherein the sending networking device uses a multipath connection to transmit data over a network to the receiving networking device;

updating a congested path metric based on the report of the congested path, wherein the congested path metric tracks a number of congested paths in the multipath connection, wherein the congested path metric is a ratio of a number of congested paths of the multipath connection versus a total number of paths in the multipath connection; and upon determining that the congested path metric exceeds a threshold, throttling the data being transmitted from the sending networking device to the receiving networking device.

14. The method of claim 13, further comprising, after updating the congested path metric:

after determining the congested path metric does not satisfy the threshold, reducing data sent on the congested path and increasing data sent on other non-congested paths of the multipath connection.

15. The method of claim 14, wherein the data sent on the other non-congested paths of the multipath connection is increased so that the sending networking device transmits data to the receiving networking device at least at a same rate that the sending networking device did before receiving the report of the congested path.

16. The method of claim 13, wherein the report is based on at least one of a switch in the network reporting congestion to the receiving networking device or congestion at a host facing interface in the receiving networking device.

17. A system comprising:

a receiving networking device; and a sending networking device configured to use a multipath connection to transmit data over a network to the receiving networking device, wherein the receiving networking device is configured to transmit a report of a congested path to the sending networking device, wherein the sending networking device is configured to:

update a congested path metric based on the report of the congested path, wherein the congested path metric tracks a number of congested paths in the multipath connection, wherein the congested path metric is a ratio of a number of congested paths of the multipath connection versus a total number of paths in the multipath connection, and throttle the data being transmitted from the sending networking device to the receiving networking device after the congested path metric satisfies a threshold.

* * * * *